Nov. 24, 1959 L. R. HEIM 2,913,810
METHOD OF SIZING AND BURNISHING RACES
IN A BALL OR ROLLER BEARING
Filed Nov. 16, 1955 6 Sheets-Sheet 4

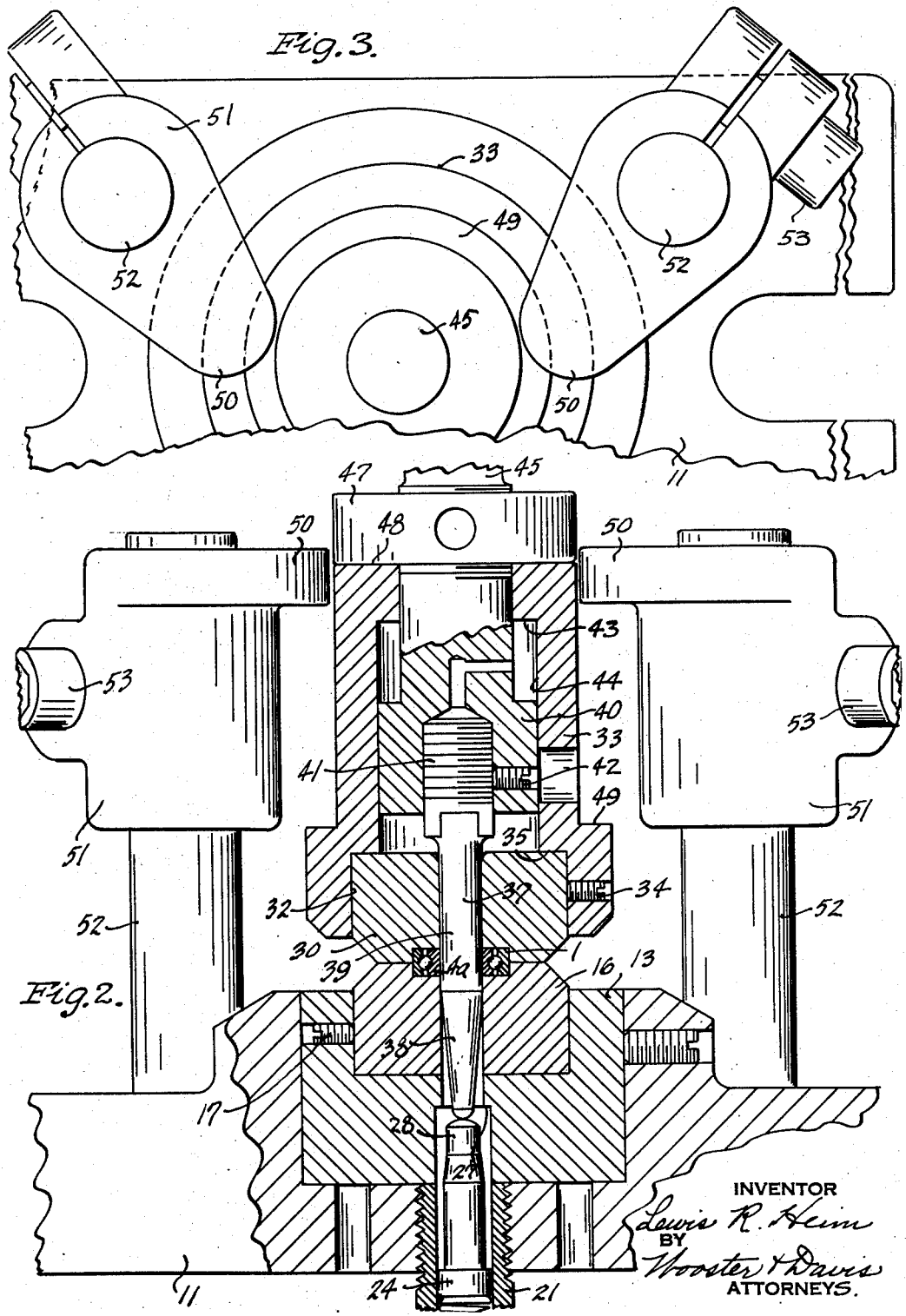

INVENTOR
Lewis R. Heim
BY
Wooster & Davis
ATTORNEYS.

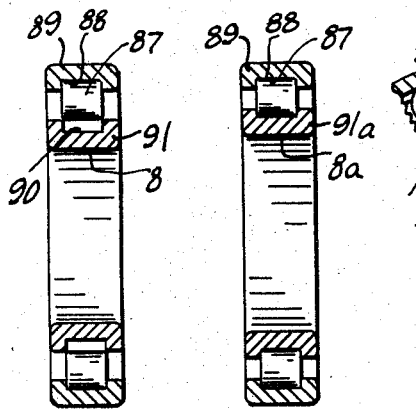 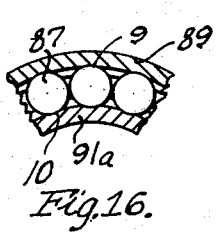 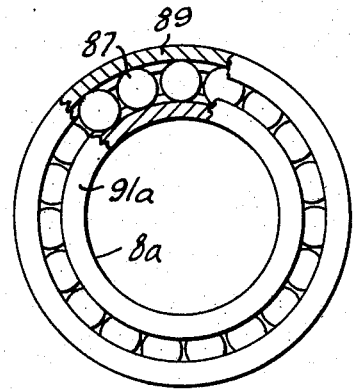
Fig.14. Fig.15. Fig.16. Fig.17.
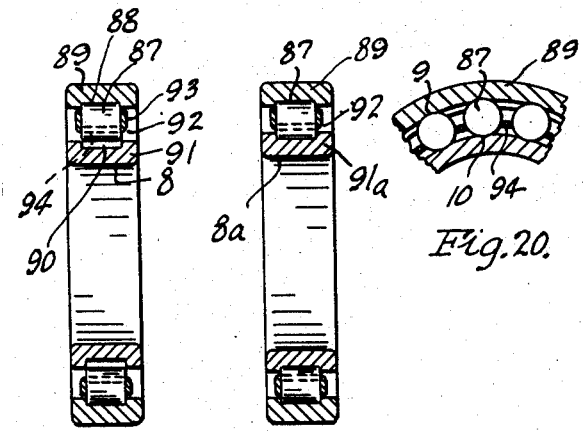 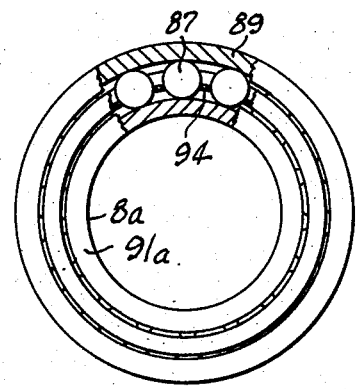
Fig.18. Fig.19. Fig.20. Fig.21.

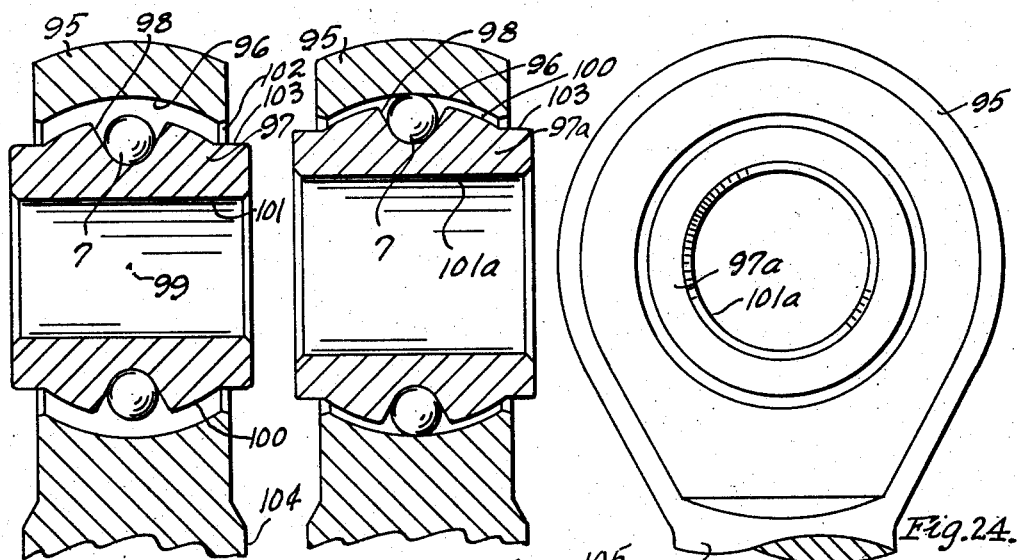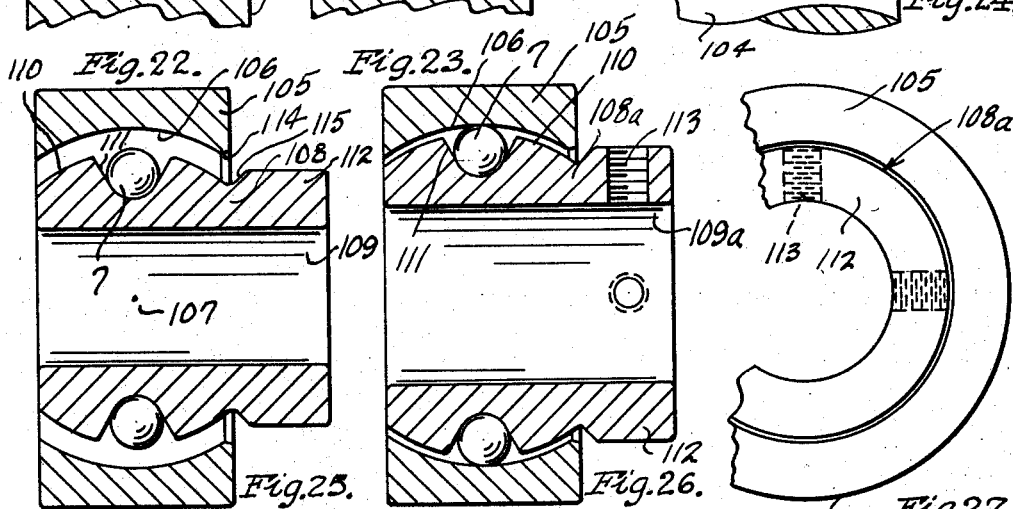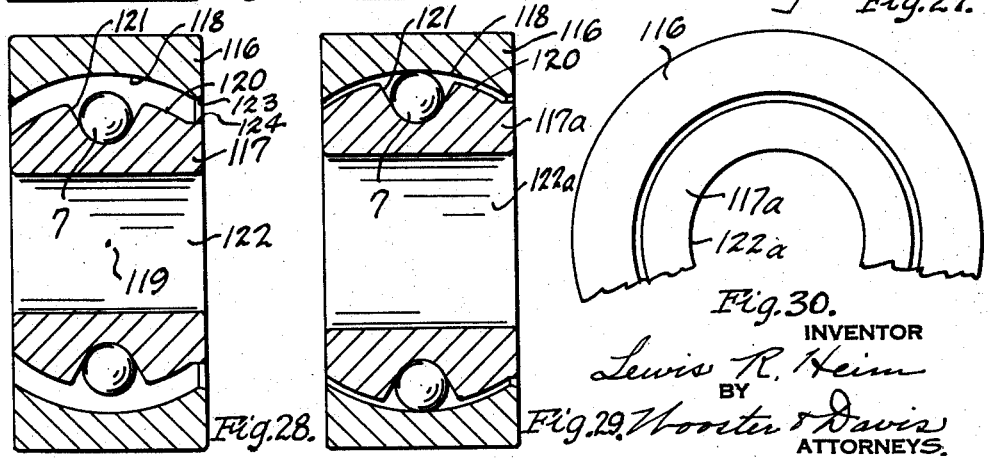

United States Patent Office 2,913,810
Patented Nov. 24, 1959

2,913,810

METHOD OF SIZING AND BURNISHING RACES IN A BALL OR ROLLER BEARING

Lewis R. Heim, Fairfield, Conn., assignor, by mesne assignments, to Channing Corporation, New York, N.Y., a corporation of California Application November 16, 1955, Serial No. 547,089

5 Claims. (Cl. 29—148.4)

This invention relates to a method of producing ball and roller bearings, and has for an object to provide an improved method of assembling the bearing and produce an improved and inexpensive bearing by assembling inner and outer members of the bearing having aligned raceways with antifriction rolling elements between them, and by then expanding the inner member to assemble the bearing into preloaded interlocking relation with the rolling elements and the outer member, and employing the rolling elements to coin, size and burnish the raceways for these elements to a high degree of precision and finish by rotating one of the raceway members with respect to the other.

With the foregoing and other objects in view, I have devised the novel method with means by which it may be accomplished as illustrated in the accompanying drawings forming a part of this specification. It is, however, to be understood that the invention is not limited to the specific details shown or described, but may embody various changes and modifications with the scope of the invention.

In these drawings:

Fig. 2 is a partial section and partial elevation showing the die elements in position after performing the expanding and assembling operation;

Fig. 3 is a partial top plan view thereof;

Fig. 14 is a section showing the elements partially assembled, using rollers as the antifriction rolling elements and showing their relation before the inner raceway element is expanded;

Fig. 15 is a similar view showing the inner raceway member expanded;

Fig. 16 is a partial peripheral section illustrating an effect which may be used in the method of assembling the elements of Figs. 14 and 15;

Fig. 17 is a partial side elevation and partial section of the completed bearing using the elements of Figs. 14 and 15;

Fig. 18 is a section of the partially assembled bearing using rollers as the antifriction rolling elements and a cage or separator for positioning the rollers, the inner raceway member being shown in non-expanded position;

Fig. 19 is a similar view showing the inner raceway member expanded to assemble and interlock the elements of the bearing;

Fig. 20 is a partial peripheral section illustrating an effect which may be used in the method of assembling the elements of Figs. 18 and 19;

Fig. 21 is a partial side elevation and a partial section of the completed bearing using the elements of Figs. 18 and 19;

Fig. 22 is a section showing how the method may be used for assembling a ball or similar antifriction bearing in an end member of a rod or cable connection, showing the elements before the inner member is expanded;

Fig. 23 is a similar section showing the position of the elements after the inner member is expanded to assemble and interlock the elements of the bearing;

Fig. 24 is a side view looking from the right of Fig. 23;

Fig. 25 is a section showing the elements of a different form of bearing which may be formed by this method, showing the parts before the inner member is expanded;

Fig. 26 is a similar view of the inner member expanded to assemble and interlock the elements of the bearing;

Fig. 27 is a side view looking from the right of Fig. 26;

Fig. 28 is a section of still another form of bearing which may be assembled by this method showing the parts before the inner member is expanded;

Fig. 29 is a similar section showing the inner member expanded to assemble and interlock the elements of the bearing, and Fig. 30 is a partial side view looking from the right of Fig. 29.

Figure 1:
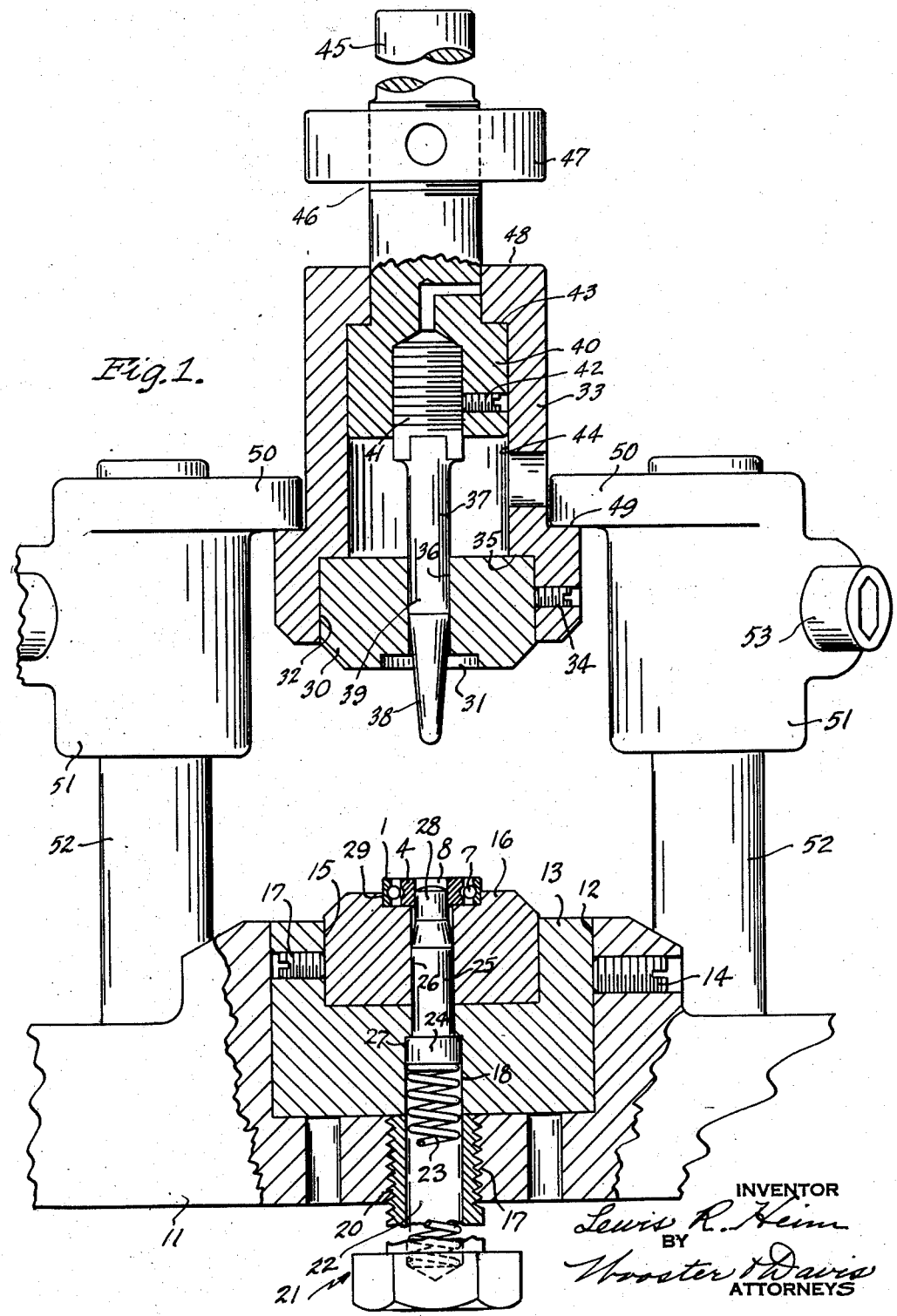
Fig. 1 is a partial vertical section and partial elevation of a die set-up and operating means for assembling the bearing by this method, showing the die elements in separated relation preparatory to the expanding and assembling operation.
Figure 5:
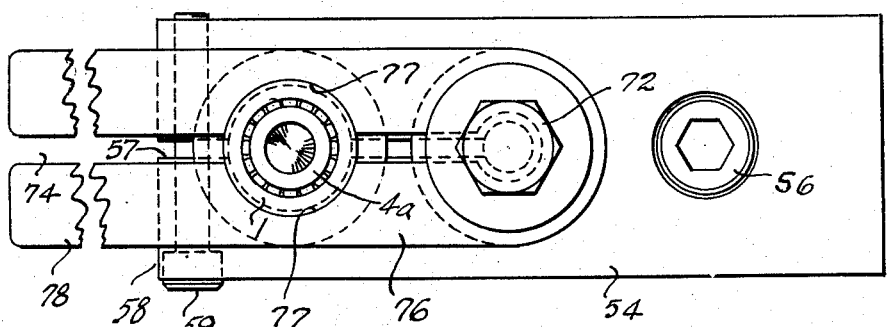
Fig. 5 is a top plan view thereof with the chuck and spindle therefor removed.
Figure 4:
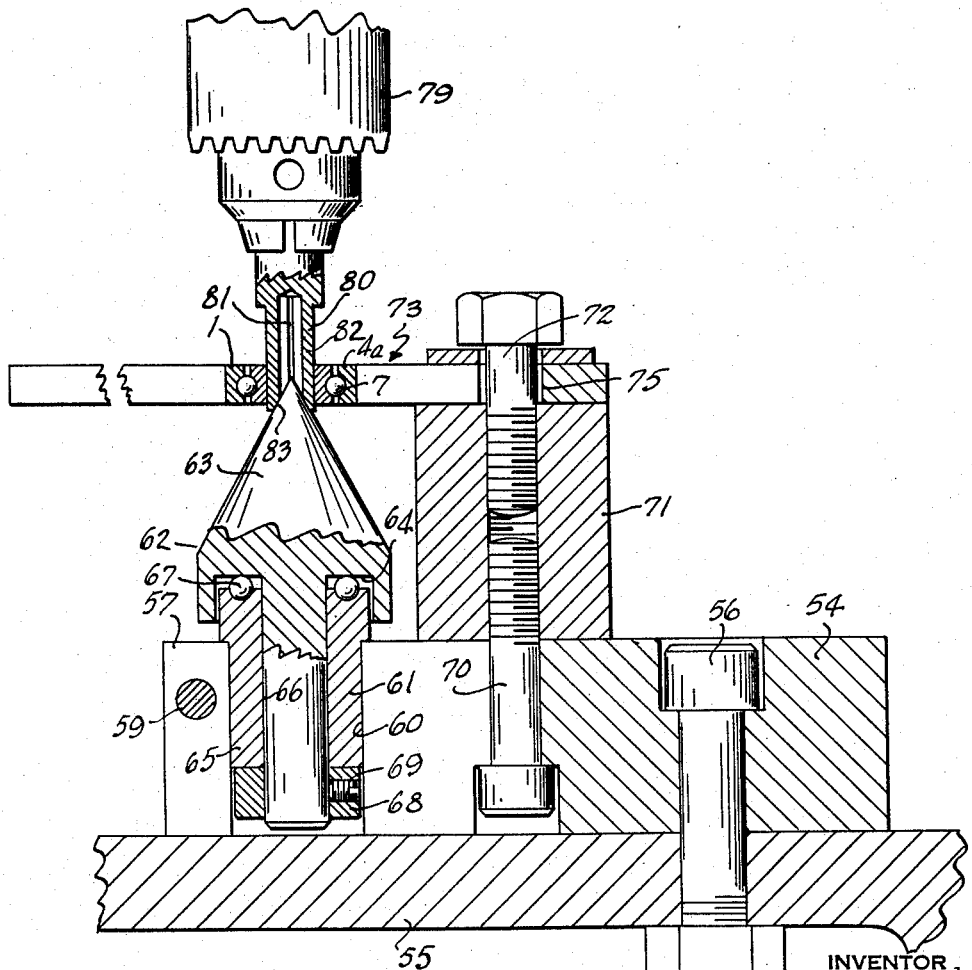
Fig. 4 is a partial section and partial side elevation of a device which may be used for completing the method of assembling and finishing the bearing.
Figure 6:
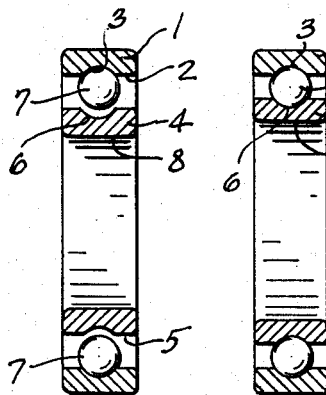
Fig. 6 is a transverse section of a ball bearing in partial assembled relation before expanding the inner member.

In carrying out this improved method of assembling and completing antifriction bearings, an outer bearing or outer race member is made of suitable material, preferably of a suitable metal, such, for example, as steel, which may or may not be heat treatable or hardenable, depending on what application or use is to be made of the bearing. It is provided with a circular hole or opening therethrough, and an outer raceway is formed in the face of this opening. An inner cylindrical or circular undersized bearing member is formed of suitable ductile material, preferably a suitable metal, such, for example, as steel, which may or may not be heat treatable or hardenable. It is formed with a longitudinal hole or opening therethrough and with a raceway formed in its outer surface for alignment with the raceway in the outer bearing member. A series or quota of antifriction rolling elements, either balls or rollers, for example, are placed intermediate these members in the raceways, the inner bearing member being of sufficiently less diameter than the outer member that it may be inserted within the opening in the outer member, with the series or quota of antifriction rolling members intermediate the said inner and outer race members in the aligned raceways in these members, and after they are assembled in this relation the inner undersized or reduced bearing member is expanded to bring the raceway in its outer wall into engagement with the balls or rollers in the raceways and interlock said series or quota of antifriction rolling members in the raceways of said outer and inner members to assemble the bearing and preload the assembled bearing. This expanding operation of the inner bearing member interlocks the inner member with the outer member through or by means of the rolling elements, either the balls or the rollers, and the expansion of the inner member is sufficient to at least provide a tight fit between the inner and outer bearing members and the rolling elements sufficient to prevent free turning movements between them and provide a certain preloading of the bearing. The expansion of the inner member may be sufficient to cause a slight indentation or a slight compression of the metal at the surfaces of the raceways by the rolling elements. This expanding operation of the inner member effects the assembly of the elements of the bearing, and one of the bearing members is rotated relative to the other bearing member, causing rotation of the rolling members in the raceway to coin, size and burnish these surfaces of the raceways of both the inner and outer race or bearing members. This relative rotation of one of the bearing members not only finishes and causes a certain working of the surfaces of the raceways but provides a good and accurate running fit between these members and the antifriction rolling members, so that the bearing is now in condition for use in machines or other applications for antifriction bearings. After the finishing of the raceways by coining, sizing and burnishing, the bearing members may or may not be heat treated or hardened, depending on the application for which the bearing is to be used. If they are heat treated, this operation is preferably performed in an atmospherically controlled furnace, or that is, in a neutral atmosphere, thus eliminating scaling during the heat-treating operation. This expanding of the inner member may be performed by different means, but an effective means for rapidly performing this operation accurately and quickly with accurate control is shown in Figs. 1, 2 and 3 of the drawing, and a simple and effective means for rotating one of the bearing members relative to the other after assembling the elements to the preloaded condition to coin, size and burnish the raceways is shown in Figs. 4 and 5.

Examples of bearings which may be formed and assembled by this method are shown in Figs. 6 to 30. In Figs. 6 to 9, there is shown a standard type of antifriction bearing using a series of balls as the rolling antifiriction elements, this bearing comprising an outer ring-shaped bearing member 1 provided with a transverse hole or opening 2 therethrough in the wall or surface of which is provided a peripheral raceway 3, in this case in the form of a transversely concave groove or channel. The inner bearing member 4, in this case also in the form of a circular ring, is made of ductile material, preferably of relatively soft or nonhardened ductile steel, and has a cylindrical outer surface 5 in which is formed a peripheral inner raceway in the form of a groove or channel 6 complementary to that of the outer raceway 3, and a series or quota of antifriction rolling elements which may be in the form of hardened steel balls 7 are mounted to run in these raceways. The inner member 4 has a longitudinal hole or opening 8 therethrough. In assembling this bearing by this method, the inner bearing member 4 is formed undersized, and is made with an outer diameter substantially that of or slightly less than the diameter of a circle through the inner sides of the balls 7 when these balls are seated in the outer raceway 3; or that is, the outer diameter of the inner bearing member is less than the diameter of the raceway in the outer bearing member by an amount at least twice that of the diameter of the balls, so that this inner member can be inserted laterally from one side to a position within these balls, as indicated in Fig. 3, or so that this undersized inner member may be placed within the outer member with the antifriction rolling elements or balls 7 between them and in or aligned with the aligned raceways in these two members. It will be seen that in this position if the balls are in the outer raceway 3 the inner raceway 6 is spaced from these balls, or if the balls should be in the inner raceway 6 they would be spaced from the outer raceway 3.

Figure 7:
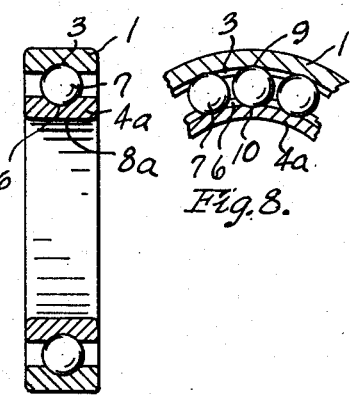
Fig. 7 is a similar section of the parts after expanding the inner member.
Figures 8, 9:
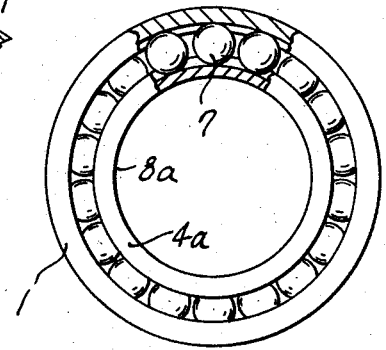
Fig. 8 is a partial peripheral section illustrating an effect which may be used in the method.
Fig. 9 is a partial side view and partial section of the finished bearing.
Figure 10:
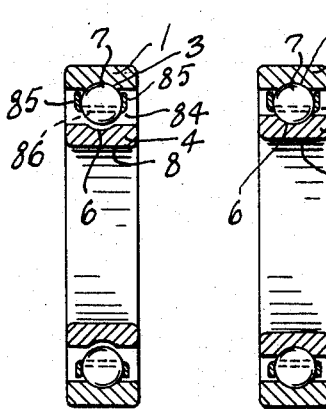
Fig. 10 is a section of a partially assembled ball bearing using a separator for the balls and showing their relation before expanding of the inner member.
Figure 11:
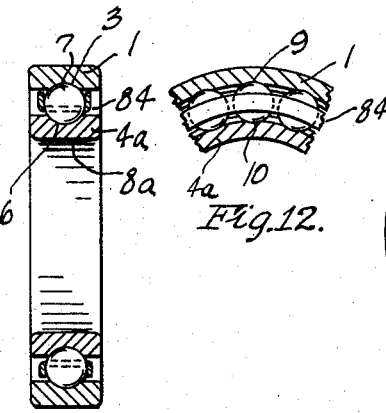
Fig. 11 is a similar view showing the inner member expanded to assemble and interlock the elements of the bearing.
Figures 12, 13:
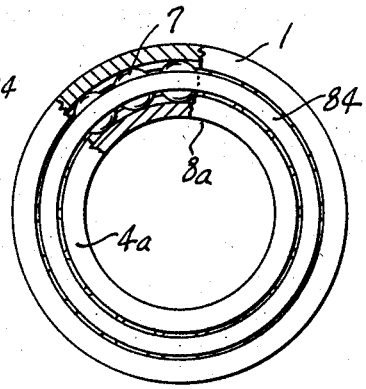
Fig. 12 is a partial peripheral section illustrating an effect which may be used in the method of assembling the bearing of Figs. 10 and 11.
Fig. 13 is a partial side elevation and partial section of the completed bearing using the elements of Figs. 10 and 11.

In effecting the assembly of the bearing, the inner bearing member 4 is expanded, as indicated in Fig. 7, so as to bring its raceway 6 into close gripping relation to the balls 7. That is, the balls are tightly gripped between the inner and outer bearing members in the two raceways in these members. The expansion of the inner member is sufficient to make a sufficiently tight grip to preload the bearing and prevent free rotation between the inner and outer members, and the expansion may be sufficient to cause a slight indentation or a slight compression of the metal at the surfaces of the raceways by the rolling elements, such as is shown greatly exaggerated, for example, at 9 and 10 in Fig. 8. This would be very slight, preferably in the neighborhood of about one-half thousandth to two thousandths of an inch. This expanding operation of the inner bearing member can be accurately controlled to produce the proper amount of expansion and secure the proper amount of preloading of the bearing and the pressure between the rolling elements and the raceways of the inner and outer bearing members. This operation also provides an interlocking relation or connection between the inner bearing member 4 and the outer bearing member 1 through these rolling elements or balls, to effect a proper assembled relation between all the members of the bearing. After the elements are assembled relative rotation is effected between the inner and outer members to secure the proper finish and sizing of the surfaces of the raceways, and to secure a good running fit between the inner and outer members and the antifriction rolling elements. As there is a tight fit or preloading of the assembled bearing this relative rotation between the inner and outer members 1 and 4 employs the rolling elements 7 to coin, size and burnish the surfaces of the two raceways to a high degree of precision and finish and secure a proper running fit between the elements of the bearing. After the elements are assembled and the coining, sizing and burnishing of the raceways is effected, if the inner and outer members 1 and 4 are made of heat treatable or hardenable material they may be heat treated and hardened and the outer side surfaces accurately ground to size and finish, as well as the surface of the enlarged opening 8a in the expanded inner member. Both or either one of the bearing members 1 and 4 may or may not be made of hardenable or heat treatable material, such, for example, as suitable heat treatable steel, and the heat treating operation may preferably be performed in an atmospherically controlled furnace using a neutral atmosphere to thus prevent or eliminate scaling. After the bearing is completed, as shown in Fig. 9, it may be used on shafts or other locations in machines or machine elements, the same as any standard antifriction bearing.

Different means may be used for expanding the undersized inner bearing member to effect the assembly, but the preferred is to force through the opening 8 in the inner bearing member a punch having a sufficiently larger diameter than this opening to secure the desired expansion, this punch having a tapered end portion leading to a straight or cylindrical land surface of the proper diameter. With such a punch the expanding operation may not only be quickly performed, but it can be readily and accurately controlled to secure just the proper expansion for the proper and desired preloading of the bearing preparatory to the relative rotation between the inner and outer members for the coining, sizing and burnishing of the raceway surfaces by the intermediate rolling antifriction elements. A die set and means for operation of such a punch is shown in Figs. 1, 2 and 3.

The die set is shown adapted for mounting in a suitable power press (not shown) for operation thereby, and comprises a die or shoe 11 adapted to be mounted or seated on the table of the press, and is provided with a recess 12 in which is seated the lower die block 13. This may be held in place by one or more set screws 14. This die block is provided with a recess or socket 15 in which is seated a lower die 16 which may be locked in place by one or more set screws 17. The shoe and block 11 and 13 are provided with aligned vertical openings 18 and 19, the opening 19 being threaded to receive the threaded shank 20 of a hollow bolt 21, the opening 22 in this sleeve or bolt aligning with the passage 18, and in these aligned passages is a coil spring 23 resting at its upper end against the under side of the head 24 of a slidable pilot 25, the head 24 being in the opening in the block 13 and its body portion in the smaller opening 26 in the die 16, thus forming a shoulder 27 cooperating with the head to limit upward movement of the pilot under action of the spring 23. The upper end of this pilot is reduced in diameter, as indicated at 28, and in the top of the die 16 is formed a recess 29 with the opening 26 leading to the bottom of this recess. This recess is of a diameter to receive the outer bearing member 1 of the bearing to be assembled and of a depth of approximately one-half the width of this member. The diameter of the reduced end portion 28 of the pilot is substantially that of the opening 8 of the undersized inner member 4 of the bearing to be assembled, so that it will center this inner member 4 within the outer member 1 as these members are seated in the recess in the die 6, and resting on the bottom of this recess with the antifriction rolling elements 7 between them in the aligned raceways 3 and 6.

The upper die in this arrangement comprises the die member 30 similar to and over the die member 16 and having in its lower side a circular recess 31 of substantially the same size and depth as the recess 29 in the lower die and in alignment therewith. This die 30 is mounted in a socket or recess 32 in the lower end of a hollow sleeve 33, and may be retained therein by one or more set screws 34 with its upper end seating against a shoulder 35 at the top of the recess. This die has a passage or opening 36 therethrough in which is slidably mounted a punch 37 having a tapered and reduced lower end portion 38 extending into the socket or recess 31, and leading to a straight land or cylindrical body portion 39. Mounted for limited sliding movement in the sleeve 33 is a cylindrical block 40 forming a carrier for the punch 37, the punch having an enlarged threaded upper end 41 screw threaded into the lower end of the block 40 for longitudinal adjustment therein, and it may be secured in adjusted position by a set screw 42. This block 40 is provided with a shoulder 42 adapted to coact with a similar shoulder at the upper end of the passage 44 in the sleeve 33 in which the block 40 is slidable, to limit upward movement of the block 40 in the sleeve. The upper end of the block 40 comprises a spindle or stem 45 adapted for securing in the slide or plunger of the press (not shown) for operation thereby, and it may be threaded at 46 to receive a stop collar 47 adjustable thereon and adapted to coact with the upper end 48 of the sleeve 33, to limit relative movement between the block 40 and the sleeve and to press and hold the die 30 against the lower die 16 in the operation of assembling the bearing by expanding the inner member 4. The sleeve 33 is provided on its outer surface with an upwardly facing shoulder 49 adapted to cooperate with a pair of limit stops 50 on split blocks or sleeves 51 slidable for vertical adjustment on guide studs 52 secured in the die or shoe 11 and extending upwardly therefrom, these blocks being adapted to be secured in different adjusted positions by suitable clamping screws 53.

In carrying out this novel method of forming and assembling the antifriction bearing illustrated in Figs. 6 to 9, the outer bearing member 1 is provided with a longitudinal opening 2 and raceway 3 is seated in the recess 29, and the lower die 16 with the undersized inner member within this opening in the outer member and the antifriction or rolling members or balls 7 between these two bearing members and in the aligned raceways therein, as shown in Fig. 1, with the reduced end 28 of the pilot 25 in the reduced opening 8 of the inner member to center this member 4 in the recess 29 and the outer member 1. This inner undersized bearing member 4 is expanded into the position of Fig. 2 to secure proper assembling of the elements of the bearing and interlocking of the inner and outer bearing members through the intermediate rolling elements 7 to secure the tight fit and preloading of the bearing, as previously described. In this operation the inner bearing member 4 is expanded by forcing the punch 37 through the opening 8 in the undersized inner bearing member, the punch being of sufficiently larger diameter than this opening to secure the proper expansion of the inner bearing member. In this operation of expanding the inner bearing member 4 the plain bearing opening 8 therein is also expanded to a larger diameter 8a, as shown in Fig. 7.

In carrying out this expanding operation of this improved method in the die set shown, after the two bearing members 1 and 4 with the balls 7 are placed in the recess in the lower die 16 and the inner or undersized bearing member 4 is centered by means of the upper reduced end portion 28 of the pilot, which is the same size as the reduced opening 8 in the inner bearing member, the pilot 25 being held in its upper position by the spring 23, and the upper die 30 and the plunger 37 being in their upper positions as shown in Fig. 1, this die and plunger are now lowered to complete the operation of expanding the reduced or undersized inner bearing member 4. This is effected by lowering the slide or plunger (not shown) of the press, in which the shank 45 is secured. Downward movement of the shank with the block 40 shifts the plunger 37 downwardly and the sleeve 33 carrying the die 30 moves down with it until the die 30 rests on top of the lower die 16. This arrests downward movement of the die 30 and the sleeve 33, but the block 40 and the plunger 37 continue to move downwardly, forcing the lower tapered end 38 of the punch through the opening 8 in the inner bearing member 4, and the punch is carried far enough to pass the tapered end portion 38 through the inner bearing member 4 and until its cylindrical or straight land body portion 39 also passes into and through the opening 8 in this member 4, as indicated in Fig. 2, the punch in this movement forcing the pilot 28 downwardly out of the opening 8 in the bearing member 4. As the body 39 of the punch 37 is of larger diameter than the hole or opening 8 of the undersized or reduced bearing member 4, it will expand this member to the position of Fig. 2, causing the inner raceway 6 in the inner bearing member to closely fit and grip the balls when located in the aligned inner and outer raceways. The relative sizes can be so proportioned that at the end of this expanding operation the expanded inner bearing member 4a causes a tight grip between the inner and outer members and the balls 7 to preload the bearing, as previously described, and this may be just sufficiently tight and provide sufficient preloading to prevent free turning between the inner and outer members 1 and 4a, or the expanding action can be extended sufficiently to provide a tighter grip and greater preloading of the elements of the bearing sufficient to cause a slight indentation or a slight compression of the surfaces of the raceway by the rolling elements, as previously described, and shown exaggerated at 9 and 10 in Fig. 8. This expansion also interlocks the inner and outer members through the antifriction rolling elements between them and effects assembly of the elements of the bearing, and the punch can at the same time finish and size the enlarged bearing opening 8a for proper fit on a shaft or other member with which the bearing is to be used.

After this expanding and assembling operation the entire upper die assembly moves upwardly to the position of Fig. 1. In this operation, as the slide or plunger of the press moves upward carrying with it the block 40, the grip or friction of the plunger 37 in the assembled bearing will carry this bearing and the die 30 and sleeve 33 upwardly with it until the shoulder 49 engages the stops 50. This arrests upward movement of the sleeve 33 and the die 30, and further upward movement of the block 40 carries with it the punch 37 and strips it from the assembled bearing, permitting removal of this bearing from the die. The assembled bearing is then operated upon to coin, size and finish the raceway surfaces in the two bearing members through the action of the intermediate antifriction rolling elements by rotating one of the bearing members relative to the other.

This may be effected in a device such as that shown in Figs. 4 and 5. This device as shown comprises a block 54 forming a bracket to be secured to the table 55 of a drill press by any suitable means, such as the bolt 56. At its free end this block or bracket is split as shown at 57 to provide gripping side members 58 connected by a transverse clamping screw or bolt 59, and these jaws or side members 58 are provided with an upright passage 60 in which is seated a bearing sleeve 61 for a live center 62 having a tapered upper end portion 63. It is recessed on its lower end 64 to embrace the upper end of the sleeve 61 and has a center bearing stud 65 having a running fit in the inner bearing passage 66 of the bearing sleeve 61 and resting thereon by an antifriction thrust bearing comprising the balls 67 which may be retained in the bearing sleeve by a collar 68 at the lower end of the stud 65 and secured thereto by a set screw 69.

Mounted on the top of the block or bracket 54 by any suitable means, such as the bolt or screw 70, is an upright spacer 71. Pivotally mounted on the top of this spacer by any suitable means, such as the pivot screw 72, is a spinning clamp 73, which in the form shown comprises a flat piece of metal slotted longitudinally at 74 from its free or outer end to the opening 75 for the pivot screw, forming two gripping side members 76 provided in their opposed edges with aligned circular recesses 77 adapted to receive and grip the outer bearing member 1 of the assembled bearing. The side members 76 are extended sufficiently beyond these gripping surfaces to provide hand grips 78 which may be gripped by the operator to clamp the bearing in the recesses 77 and hold it against turning therein. On the spindle (not shown) of the drill press is a chuck 79 in which is mounted a spring collet 80 which is slotted longitudinally at 81 on opposite sides forming spring clamping jaws 82 of a diameter to pass through the opening 8a in the inner expanded bearing member 4a of the assembled bearing. It may have a tapered entrance to the opening in this clamp, as shown at 83, to rest against the top of the tapered live center 63, so that pressure downwardly by the drill press spindle will press the lower end of the spring collet against this tapered center 63 and expand the jaws 82 of the collet into tight gripping engagement with the inner expanded member 4a of the assembled bearing. Thus rotation of this collet by rotation of the press spindle through the chuck 79 will rotate the inner member 4a of the assembled bearing while the outer member 1 is gripped and held against rotation by the clamp 73. Additional or increased loading may be applied to the bearing during this rotating operation by means of the clamp 73 by pressure laterally on it, and the opening 75 is made somewhat larger than the pivot screw 72 to permit limited or floating lateral movements of the clamp, as well as swinging or pivotal movements. This rotation of the inner member 4a of the bearing relative to the outer member 1 of the preloaded and tight fitting elements of the bearing causes the antifriction rolling elements 7 to give a coining, sizing and burnishing operation or action on the surfaces of the two raceways in the two bearing members, giving an accurate and improved finish to the surfaces of the raceways. In other words, this rolling action of the balls or rolling elements not only sizes the raceways to provide an accurate smooth running fit between the inner and outer members of the bearing and the rolling elements, but it also causes a certain ironing or working of the metal at the surfaces of the raceways, which hardens and improves the bearing and wearing characteristics of the metal of the raceways, giving a high finish and a much improved bearing and a smoother and more accurate and effective fit between the running elements of the bearing than can be effected without very extensive and expensive operations in the old methods.

Different forms of antifriction bearings which may be effectively and advantageously assembled by this method, in addition to that of Figs. 6 to 9, are shown by way of example in Figs. 10 to 30. That of Figs. 10 to 13 is the same as that of Figs. 6 to 9 except that it illustrates how this method will permit the use of a one-piece continuous separator or cage for the antifriction rolling elements, in this case the balls 7, when assembling the bearing. A cage of this type is shown at 84 which in the form shown is channel shaped in cross section, including laterally spaced parallel side flanges 85 and a transverse connecting member 86 provided with openings uniformly spaced throughout its periphery to receive the balls and properly space and locate them. This method of assembling and finishing the bearing permits the use of a separator which is in one continuous piece or ring and also permits a full quota of rolling elements or balls for maximum efficiency and maximum load-carrying capacity for the bearing.

The bearing of Figs. 14 to 17 is the same as that of Figs. 6 to 9 except that instead of using spherical balls for the rolling elements, as in Figs. 6 to 9, this bearing uses cylindrical rollers 87 for the antifriction rolling elements. The raceway 88 therefor in the outer bearing member 89 and the inner raceway 90 in the inner bearing member 91 are therefore shaped accordingly, in this case substantially flat bottom channels in both cases. The bearing, however, comprising the outer race member 89, the undersized or reduced inner member 91, together with the antifriction rollers 87, is assembled in the same way and by the same method as described in connection with the bearing of Figs. 6 to 9.

The bearing of Figs. 18 to 21 is the same as that of Figs. 14 to 17 except that a one-piece continuous cage or separator 92 is used for locating and spacing the rollers 87. This separator is the same construction as that shown for Figs. 11 to 13 comprising the laterally spaced parallel side flanges 93 and the connecting transverse portion 94 provided with openings to receive the rollers, except that these openings are rectangular instead of circular as that used for the balls of Figs. 10 to 13. The bearing is otherwise assembled by this method, the same as described in the previous form, and this method permits the use of a one-piece continuous separator for the rollers, thus permitting the use of a full quota of the rollers for the greatest efficiency and load-carrying capacity for the bearing, which is not true with the usual methods of assembling this type of bearing.

In Figs. 22 to 24 is shown how this improved method may be employed in assembling an antifriction bearing in the head of a rod, cable connector or similar type element. In these figures an end member for the connecting rod or cable is shown with a substantially circular head 95 forming the outer race member of the bearing, provided with a transverse opening on the surface of which is formed the raceway 96. The reduced inner race or bearing member 97 is provided with a grooved raceway 98 opposite the raceway 96. In this case the outer raceway 96 is made transversely concave on the arc of the circle taken about the center 99 on the axis of the opening, so that the raceway 96 is really part of the surface of a sphere struck about this center. This permits lateral rocking movement of the inner member 97 for self alignment of the bearing, as well as rotary movement, after the bearing is assembled. The inner raceway 98, however, is a peripheral groove on the outer wall of the inner member, this outer wall 100 being also preferably spherical shaped so as to be substantially parallel with the spherical raceway 96. This bearing is assembled in the same way and by the same method as that described for the previous forms. The inner member 97 is reduced or is undersized so that it may be inserted in the opening in the outer member 95 with the balls 7 in the aligned raceways between this member and the undersized or reduced inner member 97 and provided with a transverse opening 101 through it. Then this inner member is expanded by forcing the proper sized punch through this opening 101, as defined with the other forms, to expand this member and enlarge this opening, as shown in Fig. 23, the enlarged opening being shown at 101a. This forms a tight grip between the inner and outer race members and the rolling elements between them in the raceways, and preloads the bearing the same as in the other forms, and then the raceways are coined, sized and burnished by rotating one of the members, in this case most likely the inner member 97, with relation to the other member to properly finish the surfaces of the raceway and secure a smooth, accurate running fit between the elements of the assembled bearing. As previously indicated, the outer raceway 96 is formed as part of the surface of a sphere. This will permit lateral movement of the rolling elements in this raceway and therefore permit lateral rocking movements of the inner member 97a of the assembled bearing for self-aligning of the bearing. The lateral rocking movements may be limited to prevent sufficient rocking of the inner member to allow the balls to drop out of the bearing, by the coacting shoulders 102 and 103 on the outer and inner bearing members. The outer member 95 may be provided with a threaded shank 104 or other suitable means for providing a connection from the bearing to a rod, cable or other machine element.

Figs. 25 to 27 show how a similar type of bearing may be assembled to produce a self aligning bearing adapted to be secured on a shaft, rod or other means. This self aligning bearing comprises a circular or cylindrical outer member 105 provided with a transverse opening in the wall of which is formed a raceway or groove 106, and this raceway is transversely concavely curved so that it forms part of the surface of a sphere the center of which is the center 107 of the opening, and this raceway surface extends substantially the whole width of the member 105. The inner reduced or undersized member 108 is provided with a transverse longitudinal bearing opening 109 and a curved outer, preferably spherical, surface 110 in which is formed an inner raceway 111 in the form of a channel or groove. This is a groove or channel of less width than that of the raceway 106, it being substantially the width of the rolling balls 7 so as to keep them in proper alignment. The outer or larger diameter of the member 105 and its opening are such, and the inner member is sufficiently reduced in size, that the inner member and the balls when in the raceway may be inserted through one entrance opening to the raceway 106 in the outer member. In assembling the bearing the parts are assembled as shown in Fig. 25, there being a clearance between the balls and the raceways, and then the inner member 108 is expanded to member 108a in the same manner as described in the previous forms, by forcing a proper sized punch through the opening 109, which will at the same time not only expand this inner member but will also enlarge the opening 109 as indicated at 109a. The inner member is expanded as previously described sufficiently to secure the tight grip between the elements of the bearing and the preloading of the bearing, and then one of the members 105 or 108 is rotated relative to the other to secure the coining, sizing and burnishing of the surfaces of the raceways and secure an accurate smooth finish and running fit between the elements of the bearing. In this form the inner member 108 is provided with an extension at one end in the form of a cylindrical hub 112, which is also extended beyond the side of the outer member 105, and is provided with one or more tapped openings 113 to receive set screws or other means for securing this member to a shaft or other machine element extending through the opening in this member. This extension or hub 112 may also be used as the limiting means in cooperation with a shoulder 114 in the outer member to limit transverse movement of the inner member to prevent its rocking sufficiently with relation to the outer member to permit the balls to drop from the bearing. The hub is provided with an inclined shoulder 115 for this purpose. It will be seen that as this bearing is capable of lateral rocking movement as well as rotary movement it provides a self aligning bearing.

In Figs. 28 to 30 is shown a type of self-aligning bearing comprising an outer circular or cylindrical member 116 in which is an inner reduced or undersized member 117 of substantially the same width as the outer member. The outer member is provided with a transverse opening in the wall of which is a transversely curved raceway groove 118 preferably forming part of the surface of a sphere struck about the center 119 of the bearing opening, and the inner member 117 is provided with an outer curved, preferably spherical, surface 120 in which is formed a narrower raceway 121 preferably in the form of a groove of substantially the width of the balls 7. This inner member has a transverse cylindrical opening 122 therethrough, and its outer diameter and the diameter of its raceway is such that it may be inserted in the outer member 116 through one side entrance to this opening. In assembling the bearing the same method is used as described in connection with the other forms. The inner member and the balls are inserted in the opening in the outer member, as shown in Fig. 28, and the inner reduced or undersized member 117 is then expanded to the position shown in Fig. 29 by forcing through the opening 122 a punch of proper diameter. This will expand the member 117 to interlock it with the outer member and the balls 7, as indicated at 117a, and the opening 122 will also be expanded or enlarged, as shown at 122a, to form a properly sized bearing opening through the inner member. As in the previous forms the inner member is expanded to provide a tight grip and preloading of the bearing, and then either the inner or the outer member is rotated relative to the other to cause the coining, sizing and burnishing of the raceways by the rolling balls to secure the proper size and finish and good running fit between the elements of the bearing, the same as in the previous forms. The members 116 and 117 may be provided with cooperating shoulders 123 and 124 to limit the lateral rocking movement of the inner member 117a.

This method may also be carried out by forming and finishing the outer race member with its raceway to hardenable or heat treatable metal and heat treating and hardening before assembling the bearing by expanding the inner race member, and rotating one of the members for the coining, sizing and burnishing operation. In this way the slight depression or compression of the metal by the rolling elements would be in the inner raceway, and the outer hardened raceway would provide a smooth uniform track for the rolling elements in their operation of coining, sizing and burnishing the inner raceway. The inner race member could then be hardened or not as desired and depending on the use intended for the bearing. Also this modification of the method involving the finishing and hardening of the outer race member before assembling the bearing by expanding the inner race member could be employed in any of the forms of bearings shown or described. Further, the hardening or heat treating of the outer race member could be done either before or after the finishing of this member.

It will be seen from the above that with this method unbroken raceways are provided in both the inner and outer members of the bearing, also that a full quota of the rolling elements may be used and assembled in this bearing, providing maximum efficiency and maximum load-carrying capacity. Furthermore there may be used in this bearing a one-piece continuous separator for the rolling elements, and this separator also may be used with a full quota of the rolling elements. The bearing has a greater load capacity because of a full quota of the rolling elements and the unbroken raceways. In all forms the bearing may be heat treated after assembly for hardening the metal and also for greater load capacity, the heat treatment being preferably in an atmospherically controlled furnace with an inert atmosphere, thus eliminating scaling. The material of the surfaces of the raceways is worked by the rolling antifriction elements while in a relatively soft condition giving a hardening effect by the coining, sizing and burnishing action of the rolling elements, resulting in a very high finish of the surfaces of the raceways and a very accurate and smooth running fit between all the elements of the bearing.

Having thus set forth the nature of my invention, I claim:

1. A method of making antifriction bearings, comprising forming an outer bearing member with a circular opening through it and a raceway in the wall of the opening, forming an inner bearing member with a circular outer wall and a second raceway in the outer wall, at least one of the members being a ductile material, placing the members in telescoped relation with rolling elements between them, diminishing the space between the members by deforming a ductile member sufficiently to interlock the members through the rolling elements and to cause one member to exert radial force against the other member through the rolling elements, and causing the members to rotate relative to each other.

2. A method as set forth in claim 1 in which the deformed member is of heat treatable material and it is subjected to heat treatment after the members have been caused to rotate relative to each other.

3. A method as set forth in claim 1 in which the inner member is of ductile material and it is expanded.

4. A method as set forth in claim 1 in which the inner member is of heat treatable material and it is heat treated after the members have been caused to rotate relative to each other.

5. A method of making antifriction bearings, comprising forming an outer bearing member with a circular opening through it and a raceway in the wall of the opening, forming an inner bearing member with a circular outer wall and a second race way in the outer wall, at least one of the members being of ductile hardenable material, placing the members in telescoped relation with rolling elements between them, diminishing the space between the members by deforming a ductile hardenable member sufficiently to interlock the members through the rolling elements and to cause one member to exert radial force against the other member through the rolling elements, and causing the members to rotate relative to each other, and then hardening the ductile hardenable member.

References Cited in the file of this patent

UNITED STATES PATENTS

| 1,080,169 | Reed | Dec. 2, 1913 |
| 2,112,754 | Annen | Mar. 29, 1938 |
| 2,185,483 | Ward | Jan. 2, 1940 |
| 2,259,324 | Robinson | Oct. 14, 1941 |
| 2,383,727 | Lewis | Aug. 28, 1945 |
| 2,629,165 | Stillwagon | Feb. 24, 1953 |
| 2,783,528 | Menne | Mar. 5, 1957 |

FOREIGN PATENTS

| 617,991 | Great Britain | Feb. 15, 1949 |
| 924,924 | Germany | Mar. 10, 1955 |

UNITED STATES PATENT OFFICE
CERTIFICATE OF CORRECTION

Patent No. 2,913,810

November 24, 1959

Lewis R. Heim

It is hereby certified that error appears in the printed specification of the above numbered patent requiring correction and that the said Letters Patent should read as corrected below.

Column 5, line 55, for "42" read -- 43 --; column 10, line 64, for "raceway to" read -- raceway of --; column 11, line 38, for "being a ductile material" read -- being of ductile material --.

Signed and sealed this 21st day of June 1960.

(SEAL)
Attest:

KARL H. AXLINE
Attesting Officer

ROBERT C. WATSON
Commissioner of Patents